United States Patent
Singh et al.

(10) Patent No.: US 11,030,127 B2
(45) Date of Patent: Jun. 8, 2021

(54) MULTI-THREADED ARCHITECTURE FOR MEMORY CONTROLLER DATA PATHS

(71) Applicant: NXP USA, Inc., Austin, TX (US)

(72) Inventors: Vivek Singh, Noida (IN); Nikhil Tiwari, Palam Colony (IN); Sumit Mittal, Noida (IN)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 16/659,748

(22) Filed: Oct. 22, 2019

(65) Prior Publication Data

US 2021/0117345 A1  Apr. 22, 2021

(51) Int. Cl.
*G06F 13/16* (2006.01)
*G06F 13/18* (2006.01)

(52) U.S. Cl.
CPC ...... *G06F 13/1668* (2013.01); *G06F 13/1605* (2013.01); *G06F 13/18* (2013.01)

(58) Field of Classification Search
CPC ......... G06F 12/00; G06F 13/16; G06F 13/362
See application file for complete search history.

(56) References Cited

U.S. PATENT DOCUMENTS

| | | | |
|---|---|---|---|
| 5,170,266 A * | 12/1992 | Marsh | H04N 1/324 358/1.9 |
| 6,665,755 B2 | 12/2003 | Modelski et al. | |
| 6,834,378 B2 | 12/2004 | Augsburg et al. | |
| 7,512,729 B2 | 3/2009 | Bose et al. | |
| 9,703,951 B2 | 7/2017 | Patel et al. | |
| 10,042,785 B1 | 8/2018 | Buch et al. | |
| 2002/0083297 A1 | 6/2002 | Modelski et al. | |
| 2004/0221095 A1 | 11/2004 | Estakhri | |
| 2009/0006692 A1 * | 1/2009 | Blumrich | G06F 13/364 710/244 |
| 2011/0138092 A1 * | 6/2011 | Morimoto | G06F 13/1605 710/244 |
| 2012/0066444 A1 | 3/2012 | Sadowski et al. | |
| 2014/0189181 A1 * | 7/2014 | Cheng | G06F 13/374 710/118 |
| 2017/0168934 A1 | 6/2017 | Singh et al. | |
| 2019/0079881 A1 * | 3/2019 | Nakazono | G06F 13/18 |
| 2019/0138452 A1 * | 5/2019 | Avrukin | G06F 3/0658 |

* cited by examiner

*Primary Examiner* — Getente A Yimer
(74) *Attorney, Agent, or Firm* — Rajeev Madnawat

(57) ABSTRACT

A memory controller includes a large combinational cloud to serve multi-core-to-multi-bank memory accesses which causes congestion and routing delays at physical design level especially in lower technology nodes thus limiting the frequency of operation. Present invention proposes an architecture to process sequences of access requests from multiple processing cores using alternating processing to generate sequences of granted access requests to one or more memory banks. For each processing core, first and second buffers store access requests. When an access request from one buffer is granted, that buffer is configured to receive a new access request and processing is performed to determine whether to grant an access request stored in the other buffer. The invention can maintain optimal bandwidth while providing desired sequences of the granted access requests and solving physical congestion issues.

15 Claims, 4 Drawing Sheets

MULTI-THREADED ARCHITECTURE FOR MEMORY CONTROLLER DATA PATHS

BACKGROUND

The present invention generally relates to integrated circuits, and, more particularly, to a memory controller.

Integrated circuits (ICs) often include multiple processing cores for processing data packets and a shared memory for storing the data packets. ICs also include a memory controller that manages communication between the cores and the shared memory. To access the data packets stored in the memory, a core issues an access request that includes a memory address. The memory controller grants access to the core only after an on-going transaction with the memory is completed. Thus, due to contention, the core must wait before it can access the memory. This waiting period is referred to as the dynamic latency of the core.

A known technique to reduce dynamic latency involves interleaving of memory addresses, which requires the shared memory to be divided into multiple memory banks. Each memory bank is accessible, independent of other memory banks. Interleaving of addresses involves mapping contiguous addresses to memory locations in separate memory banks. The interleaving scheme may depend on the size of a contiguous address block mapped to each memory bank, for instance, interleaving based on a page size, a cache-line, and an address boundary. The cores generate access requests that include addresses mapped to memory locations present in separate memory banks due to interleaving of the addresses. Thus, address interleaving permits a core to sequentially access separate memory banks. Address interleaving also permits different cores to simultaneously access separate memory banks, leading to a reduction in dynamic latency. However, since only one core can access a memory bank in one access cycle, a memory access conflict arises when multiple cores try to simultaneously access the same memory bank.

A known technique to resolve memory access conflicts involves including an arbiter in the memory controller. The memory controller assigns a priority level to each core based on factors such as the core type and the access request type and then provides the cores access to the memory based on the assigned priority levels, thereby establishing a sequence of access for the cores.

To ensure fair access to the cores (i.e., to prevent starvation of low-priority access requests), the arbiter can modify the access sequence using arbitration techniques such as rotating priority, round robin, and least recently accessed core. However, these arbitration techniques do not allow a user to dynamically determine the access sequence, and hence, a select logic circuit is included in the arbiter to allow a user to configure the access sequence. However, including such select logic requires redesigning the existing arbiter, which increases the complexity of the circuit and the circuit area.

It would be advantageous to have a memory controller that provides multiple cores access to memory with reduced dynamic latency and contention and dynamically determines the access sequence without significantly increasing the complexity of the memory controller and the circuit area.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale. For example, the thicknesses of layers and regions may be exaggerated for clarity.

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

As used herein, the singular forms "a", "an", and "the", are intended to include the plural forms as well, unless the context clearly indicates otherwise. It further will be understood that the terms "comprises", "comprising", "has", "having", "includes", or "including" specify the presence of stated features, steps, or components, but do not preclude the presence or addition of one or more other features, steps, or components. It also should be noted that, in some alternative implementations, the functions/acts noted might occur out of the order noted in the figures. For example, two figures shown in succession may in fact be executed substantially concurrently or may sometimes be executed in the reverse order, depending upon the functionality/acts involved. The term "or" is to be interpreted as inclusive unless indicated otherwise.

In an embodiment of the present invention, an article of manufacture comprises N processing cores, wherein N is an integer greater than 1; M memory banks, wherein M is an integer greater than or equal to 1; and a memory controller configured to enable the N processing cores to access the M memory banks. The memory controller is configured to (i) receive a sequence of one or more access requests from each of one or more of the processing cores, wherein each access request is a request for access by the corresponding processing core to a specified memory bank, and (ii) process access requests from one or more of the processing cores to generate a current sequence of one or more granted access requests to each of one or more of the memory banks. For each processing core, the article comprises first and second buffers configured to alternately store access requests after address decoding. Initially, the request from the first buffer is presented for arbitration, and the result of the arbitration is granted in the same cycle. When this grant is received back after registering in the next cycle, the first buffer is configured to receive a new access request, and the request from the second buffer is presented for arbitration. Similarly, when the grant is received for the second buffer's request, the second buffer is configured to receive a new access request, and processing is performed to determine whether to grant an access request stored in the first buffer.

Figure 1:
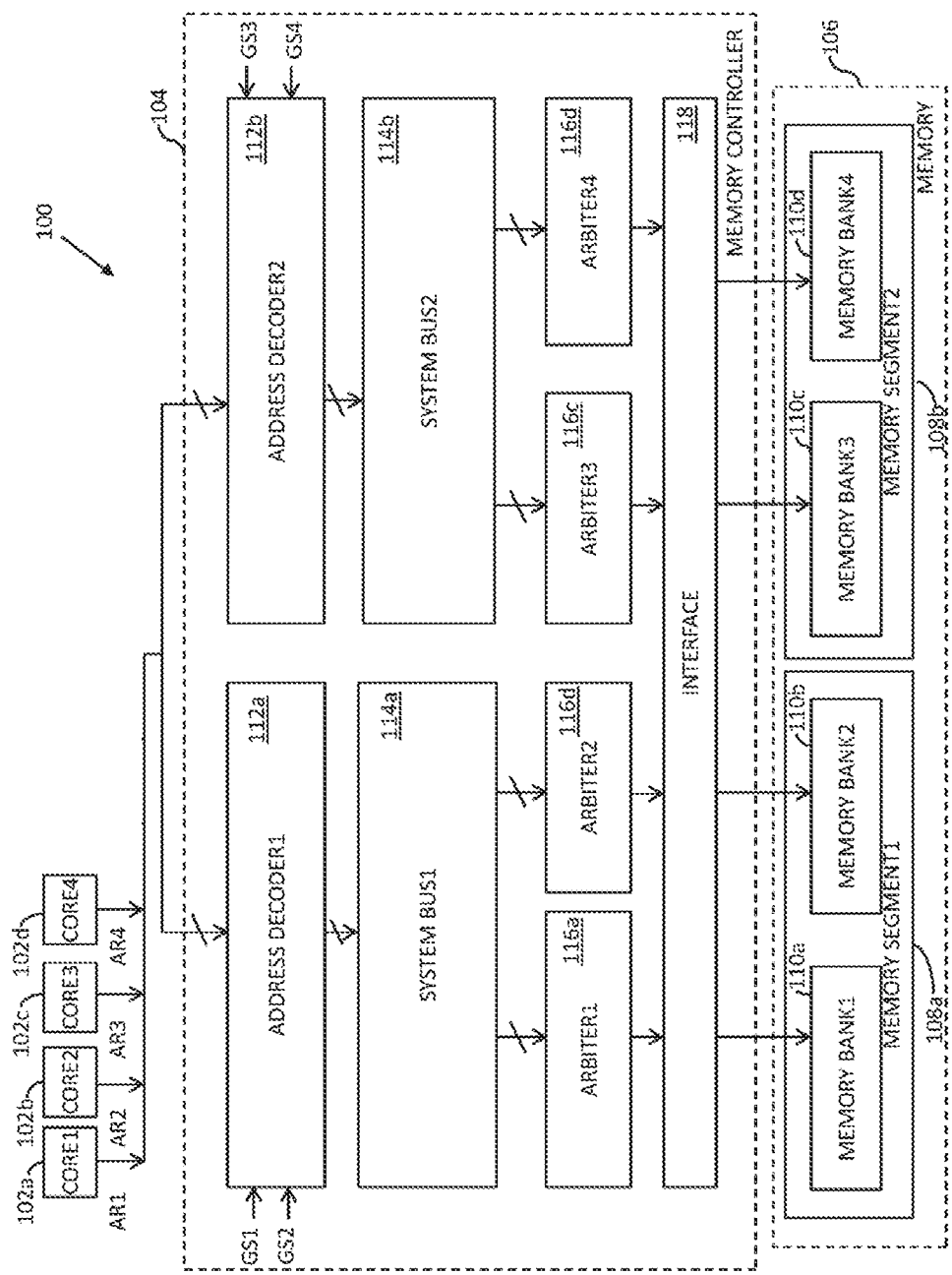
FIG. 1 is a schematic block diagram of an integrated circuit (IC) including a memory controller in accordance with an embodiment of the present invention.
Figure 2:
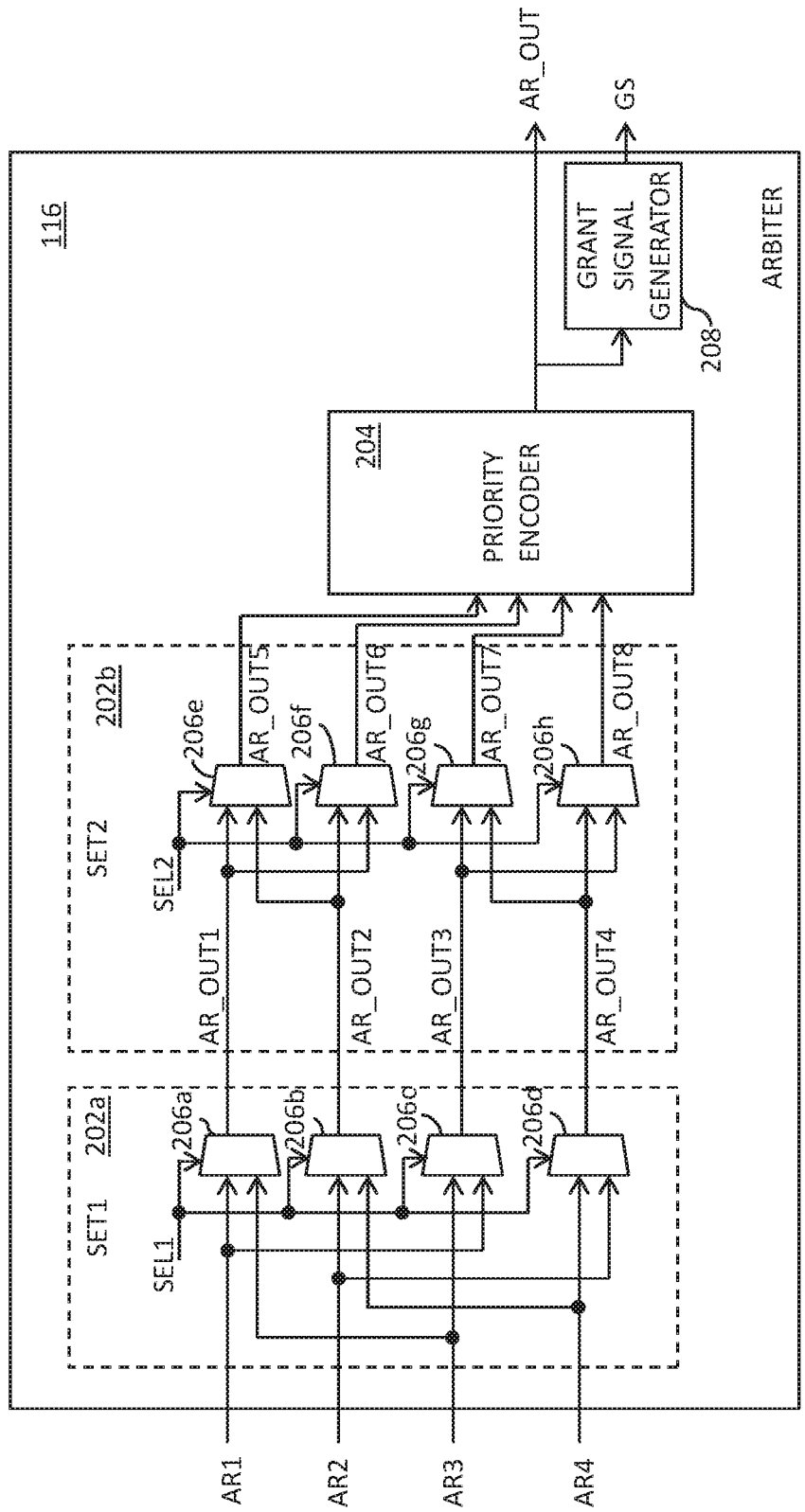
FIG. 2 is a schematic block diagram of an arbiter of the memory controller of FIG. 1 in accordance with an embodiment of the present invention.

FIGS. 1 and 2 are from U.S. Patent Application Publication No. US 2017/0168934 A1 ("the '934 application"), the teachings of which are incorporated herein by reference in their entirety.

FIG. 1 is a schematic block diagram of an integrated circuit (IC) 100 in accordance with an embodiment of the present invention. The IC 100 includes a plurality of cores 102 including first through fourth cores 102a-102d, a memory controller 104, and a memory 106. The memory 106 includes a plurality of memory segments 108 including first and second memory segments 108a and 108b. Each memory segment 108 includes a plurality of memory banks 110. In an example, the first memory segment 108a includes first and second memory banks 110a and 110b, and the second memory segment 108b includes third and fourth memory banks 110c and 110d. In one implementation, the memory banks 110 are static random-access memories (SRAMs). In other implementations, the memory banks 110 may be other types of memories such as (without limitation) dynamic random-access memories (DRAMs) and flash memories.

Although the IC 100 of FIG. 1 has four cores 102a-102d and four memory banks 110a-110d, in other implementations, ICs of the present invention may have other numbers of cores 102 and other numbers of memory banks 110. In an example, real-world implementation, an IC of the present invention has 64 cores 102 vying for access to 24 memory banks 110.

For each memory segment 108, the memory controller 104 includes an address decoder 112, a system bus 114, and an arbiter 116 corresponding to each memory bank 110 in the memory segment 108. In an example, the memory controller 104 includes first and second address decoders 112a and 112b, first and second system buses 114a and 114b, and first through fourth arbiters 116a-116d. The first address decoder 112a and the first system bus 114a correspond to the first memory segment 108a, and the second address decoder 112b and the second system bus 114b correspond to the second memory segment 108b. The first through fourth arbiters 116a-116d are connected to the corresponding first through fourth memory banks 110a-110d, respectively, by way of an interface 118.

The first through fourth cores 102a-102d generate first through fourth access requests AR1-AR4, respectively. The first through fourth access requests AR1-AR4 include first through fourth sets of address least significant bits (LSBs), respectively.

The first and second address decoders 112a and 112b are connected to the first through fourth cores 102a-102d to receive the first through fourth access requests AR1-AR4. The first address decoder 112a identifies each of the first and second memory banks 110a and 110b in the first memory segment 108a based on the first through fourth sets of address LSBs. The second address decoder 112b identifies each of the third and fourth memory banks 110c and 110d in the second memory segment 108b based on the first through fourth sets of address LSBs.

The first and second system buses 114a and 114b are connected to the first and second address decoders 112a and 112b, respectively. Each system bus 114 may receive and route one or more of the first through fourth access requests AR1-AR4 to the corresponding memory banks 110 when the corresponding memory banks 110 are available for a memory access. Each system bus 114 stalls its access requests to the corresponding memory banks 110 when the corresponding memory banks 110 are unavailable for a memory access. Each system bus 114 routes multiple access requests to a single memory bank 110 in a sequence. This sequence indicates an order of predetermined priority levels of the cores 102 corresponding to the access requests. Each system bus 114 maintains an (N×M) matrix that stores and routes access requests by N cores 102 to M corresponding memory banks 110. In the example embodiment of FIG. 1, each system bus 114 maintains a (4×2) matrix that stores and routes access requests by the four cores 102a-102d to two corresponding memory banks, i.e., memory banks 110a and 110b for system bus 114a and memory banks 110c and 110d for system bus 114b.

The first arbiter 116a is connected to the first system bus 114a and is configured to modify the access sequence to avoid starvation of the cores 102. When one or more of the first through fourth cores 102a-102d request access to the first memory bank 110a, the first arbiter 116a provides one of those cores 102 access to the first memory bank 110a in an access cycle. The second arbiter 116b is similarly connected to the first system bus 114a, and the third and fourth arbiters 116c and 116d are similarly connected to the second system bus 114b.

FIG. 2 is a schematic block diagram of each arbiter 116 of FIG. 1. The arbiter 116 includes first and second sets 202a and 202b of muxes 206, a priority encoder 204, and a grant signal generator 208. The first set 202a includes first through fourth 2:1 muxes 206a-206d, and the second set 202b includes fifth through eighth 2:1 muxes 206e-206h. As understood by those skilled in the art, the number of sets 202 of muxes 206 and the number of muxes 206 in each set 202 depend on the number of cores 102 handled by the arbiter 116. The sets 202 of muxes 206 correspond to and perform the combinatorial logic of the arbiter 116 based on the selection signals SEL1 and SEL2 applied to the muxes 206.

The arbiter 116 receives one or more of the first through fourth access requests AR1-AR4 from the corresponding system bus 114 of FIG. 1. The operations of the combinatorial logic of the arbiter 116 are described in detail in the '934 application and are not repeated here.

The priority encoder 204 compares the priority levels between different requests generated by different cores for the same memory bank and selects the request with the highest priority for grant generation. Priority is assigned for different cores beforehand.

The grant generator 208 is connected to the output terminal of the priority encoder 204 and receives one of the first through fourth access requests AR1-AR4. The grant generator 208 generates a grant signal (GS) at a first logic state (e.g., logic 1) when the corresponding memory bank 110 is available for memory access and at a second logic state (e.g., logic 0) when the corresponding memory bank 110 is unavailable for memory access. The corresponding memory bank 110 is unavailable for memory access in an access cycle when the arbiter 116 provides one of the first through fourth cores 102a-102d access to the corresponding memory bank 110 during that access cycle. The corresponding address decoder 112 receives the grant signal (GS) and determines whether the corresponding memory bank 110 is available for memory access.

Based on the operations of each arbiter 116, the memory controller 104 of FIG. 1 implements an interleaving and arbitration scheme and resolves any contention among the first through fourth cores 102a-102d for access to each memory bank 110 by determining a corresponding sequence of access for the first through fourth cores 102a-102d. The memory controller 104 can modify the sequence of the predetermined priority levels of the first through fourth cores 102a-102d to avoid starvation of cores 102 having lower priority levels. In this way, the memory controller 104 achieves a high bandwidth of data transfer in each access cycle. Further, the memory controller 104 can handle wide access requests by providing a core 102 access to adjacent memory banks 110 in a single access cycle.

Figure 3:
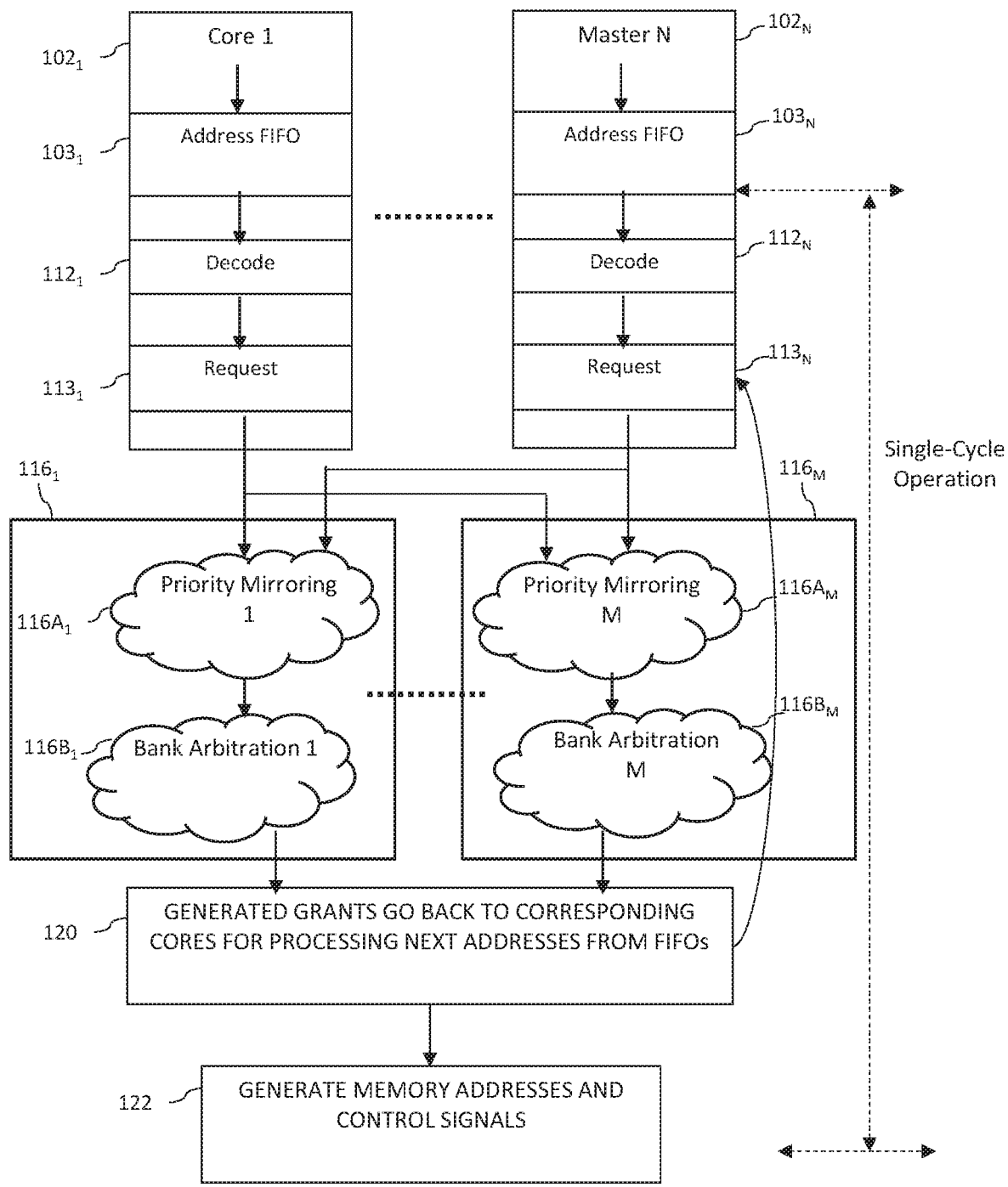
FIG. 3 is a schematic flow diagram of memory-access processing according to a conventional implementation of the IC of FIGS. 1 and 2.

FIG. 3 is a schematic flow diagram of memory-access processing according to a conventional implementation of an IC analogous to the IC 100 of FIGS. 1 and 2 having N cores $102_1$-$102_N$ analogous to the cores 102a-102d of FIG. 1 and M memory banks $110_1$-$110_M$ (not shown in FIG. 3) analogous to the memory banks 110a-110d of FIG. 1, where N is a positive integer greater than one and M is a positive integer. As shown in FIG. 3, each core $102_i$ has a corresponding address FIFO (first in, first out) register $103_i$ that stores a set of addresses in the memory banks 110 to be sequentially accessed by that core $102_i$. For each core $102_i$, the current address output from the corresponding address FIFO $103_i$ is decoded $112_i$ and a corresponding current access request is generated $113_i$.

If any cores 102 have current access requests for the first memory bank $110_1$, then those access requests are provided to the first priority mirroring stage $116A_1$ of the first arbiter $116_1$. If any cores 102 have current access requests for the second memory bank $110_2$, then those access requests are provided to the second priority mirroring stage $116A_2$ of the second arbiter $116_2$ (not explicitly shown in FIG. 3). And so on such that, if any cores 102 have current access requests for the Mth memory bank $110_M$, those access requests are provided to the Mth priority mirroring stage $116A_M$ of the Mth arbiter $116_M$.

Each priority mirroring stage $116A_j$ implements combinatorial logic analogous to the combinatorial logic of FIG. 2 to prioritize the different access requests received from the different cores 102 for the corresponding memory bank $110_j$. Note that the design of the combinatorial logic will depend on the number M of different memory banks 110. Each set of prioritized access requests is then provided to a corresponding bank arbitration stage $116B_j$ of the jth arbiter $116_j$. The bank arbitration stage $116B_j$ returns the grant for the highest priority access request. Collectively, the M bank arbitration stages 116B output up to M granted access requests in each access cycle, one for each memory bank $110_j$ receiving an access request.

In step 120, each core $102_i$ that had an access request granted is informed of that fact so that that core $102_i$ will then process the next access request in its address FIFO $103_i$. In step 122, each granted access request is performed using a suitable procedure as understood by those skilled in the art.

One goal is to ensure that all of the memory-access processing of FIG. 3 for the current set of up to N access requests from the N cores $102_1$-$102_N$ are performed in a single clock cycle to make sure that there are no gaps in between consecutive accesses to any single memory bank $110_j$ so that, in the next cycle, another set of up to N access requests can be processed in order to maintain optimal bandwidth utilization.

As described previously, FIG. 2 shows the combinatorial logic of each arbiter 116 in the IC 100 of FIG. 1 having only four cores 102a-102d, where the IC 100 has four respective arbiters 116a-116d for the four different memory banks 110a-110d. As described previously, in some real-world implementations, an IC can have many more than four cores and many more than four memory banks. For example, a typical IC may have N=64 different cores $102_1$-$102_{64}$ and M=24 different memory banks $110_1$-$110_{24}$. Such an IC will have 24 separate arbiters $116_1$-$116_{24}$, each having combinatorial logic that is larger and more complex than the combinatorial logic of FIG. 2. In an IC having 24 separate, large, and complex arbiters $116_1$-$116_{24}$, the arbiter's combinatorial logic causes congestion and routing delays at the physical design level, thus limiting the frequency of operation.

One way to address the timing problems associated with ICs having many cores 102 accessing many memory banks 110 is to add pipelining step between steps 120 and 122, where the granted access requests processed in step 120 are stored in (e.g., flip-flop) registers during one clock cycle and then processed in step 122 during the next clock cycle.

Assume, for example, a scenario in which the first core $102_1$ generates three respective access requests a1_1, a2_1, a3_1 for the first memory bank $110_1$ during the first three clock cycles 1, 2, and 3 and that the second core $102_2$ generates three respective access requests b1_1, b2_1, b3_1 for that same first memory bank $110_1$ during those same first three clock cycles 1, 2, and 3. In that case, the first and second cores $102_1$ and $102_2$ are contending for the same first memory bank $110_1$, but each memory bank $110_j$ can be accessed by only one core $102_i$ at a time.

Note that, depending on the particular situation, each of the other cores $102_3$-$102_N$ may also be generating an access request for any one of the memory banks 110 during each of these same clock cycles. For this particular example, it is assumed that only the first and second cores $102_1$ and $102_2$ generate access requests for the first memory bank $110_1$ during the clock cycles 1, 2, and 3, and that no access requests are generated for the first memory bank $110_1$ by any core 102 during the next three clock cycles 4, 5, and 6.

Assume further that the first core $102_1$ has higher priority than the second core $102_2$, such that all of the pending access requests for the first core $102_1$ should be performed prior to any of the pending access requests for the second core $102_2$. In that case, the IC should be configured to perform the following sequence of access events for the first memory bank $110_1$:

Clock cycle 1: Perform access request a1_1 for the first core $102_1$;
Clock cycle 2: Perform access request a2_1 for the first core $102_1$;
Clock cycle 3: Perform access request a3_1 for the first core $102_1$;
Clock cycle 4: Perform access request b1_1 for the second core $102_2$;
Clock cycle 5: Perform access request b2_1 for the second core $102_2$; and
Clock cycle 6: Perform access request b3_1 for the second core $102_2$.

However, the pipelining added to the memory-access processing of FIG. 3 results in a gap between two consecutive accesses by a particular core $102_i$ to a particular memory bank $110_j$. As a result, for the above example scenario, the IC will perform the following, improper sequence of access events for the first memory bank $110_1$:

Clock cycle 1: Perform access request a1_1 for the first core $102_1$;
Clock cycle 2: Perform access request b1_1 for the second core $102_2$;
Clock cycle 3: Perform access request a2_1 for the first core $102_1$;
Clock cycle 4: Perform access request b2_1 for the second core $102_2$; and
Clock cycle 5: Perform access request a3_1 for the first core $102_1$;
Clock cycle 6: Perform access request b3_1 for the second core $102_2$.

Figure 4:
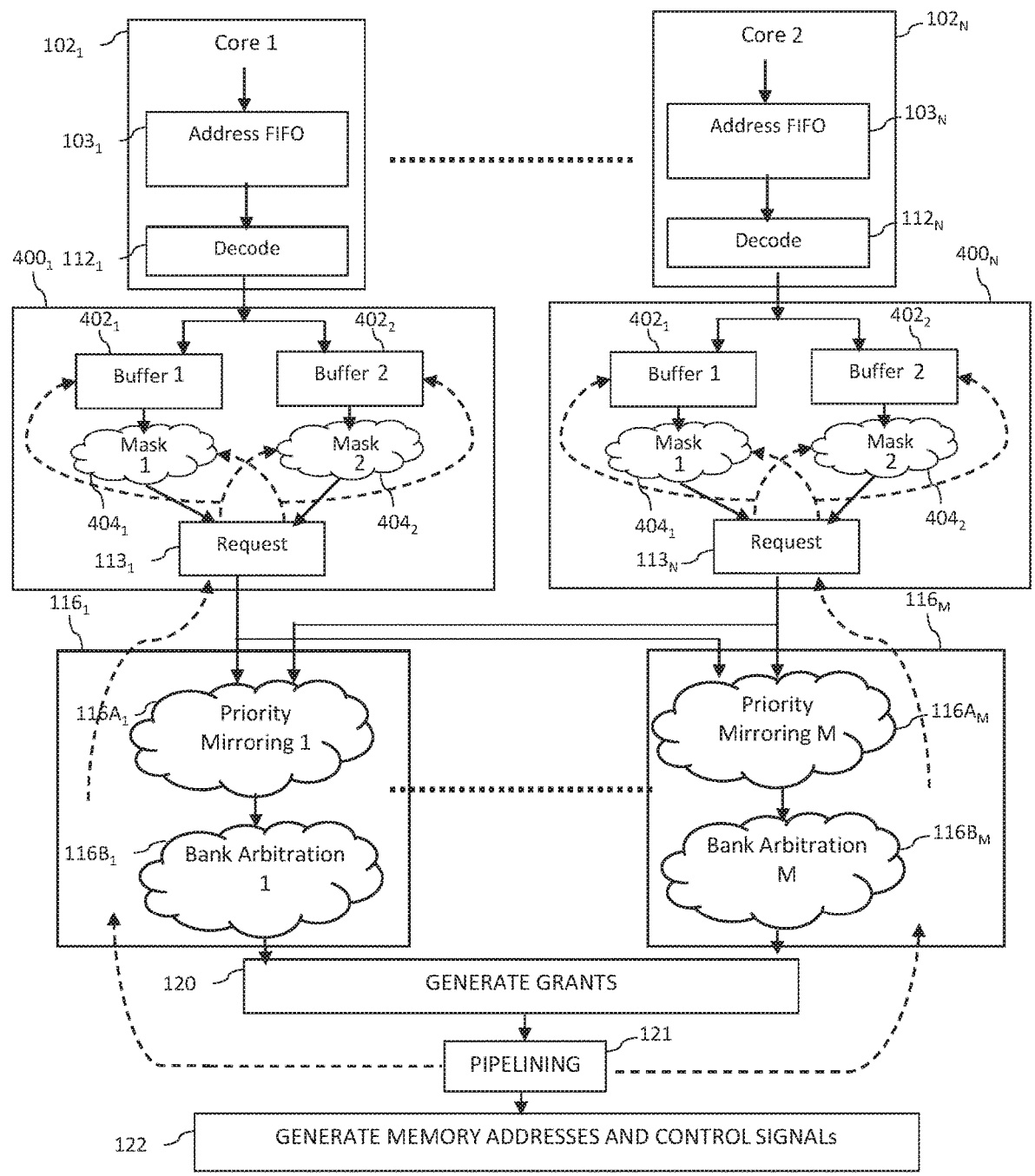
FIG. 4 is a schematic flow diagram of memory-access processing according to an inventive implementation of the IC of FIGS. 1 and 2.

FIG. 4 is a schematic flow diagram of memory-access processing according to an inventive implementation of the IC of FIGS. 1 and 2 having N cores $102_1$-$102_N$ similar to the N cores $102_1$-$102_N$ of FIG. 3 and M memory banks $110_1$-$110_M$ (not shown in FIG. 4) similar to the M memory banks $110_1$-$110_M$ of FIG. 3. The processing of FIG. 4 is identical to the processing of FIG. 3 except for the inclusion of a parallel address processing stage $400_i$ for each core $102_i$ and the addition of a register-based pipelining step 121 between steps 120 and 122.

As shown in FIG. 4, each parallel address processing stage $400_i$ has two buffers $402_1$ and $402_2$ and two corresponding masks $404_1$ and $404_2$ in addition to a request generator $113_i$ that is similar to the request generator $113_i$ of FIG. 3. When a mask $404_k$ is enabled, an address stored in the corresponding buffer $402_k$ is prevented from being propagated towards the request generator $113_i$. When a mask $404_k$ is disabled, an address stored in the corresponding buffer $402_k$ is propagated towards the request generator $113_i$, overwriting whatever request was being generated previously.

When the IC is initially powered up, both masks $404_1$ and $404_2$ in all of the parallel address processing stages $400_1$-$400_N$ are enabled. When the first core $102_1$ (eventually) decodes ($112_1$) its first access request from its address FIFO $103_1$, the first core's parallel address processing stage $400_1$ stores the resulting first decoded address in its first buffer $402_1$ and disables its first mask $404_1$, thereby allowing the first decoded address to be propagated from the first buffer $402_1$ into the first core's request generator $113_1$.

When the first core $102_1$ (eventually) decodes ($112_1$) its second access request from its address FIFO $103_1$, assuming that the access request associated with that first decoded address has not yet been granted, the first core's parallel address processing stage $400_1$ stores the resulting second decoded address in its second buffer $402_2$ but keeps its second mask $404_2$ enabled, thereby preventing the second decoded address from being propagated from the second buffer $402_2$ into the first core's request generator $113_1$.

When the access request associated with the first core's first decoded address and generated by the request generator $113_1$ is eventually granted by the first arbiter $116_1$ in step 120, the pipelining step 121 will inform the first core $102_1$ of that event in the next clock cycle. In response, the first core's parallel address processing stage $400_1$ enables its first mask $404_1$ and disables its second mask $404_2$, thereby allowing the first core's second decoded address to be propagated from its second buffer $402_2$ into its request generator $113_1$. In addition, if and when available, the first core's parallel address processing stage $400_1$ stores the first core's third decoded address into its first buffer $402_1$.

When the access request associated with the first core's second decoded address is eventually granted, the pipelining step 121 will inform the first core $102_1$ of that event. In response, the first core's parallel address processing stage $400_1$ disables its first mask $404_1$ and enables its second mask $404_2$, thereby allowing the first core's third decoded address (if available) to be propagated from its first buffer $402_1$ into its request generator $113_1$. In addition, if and when available, the first core's parallel address processing stage $400_1$ stores the first core's fourth decoded address into its second buffer $402_2$.

The first core's parallel address processing stage $400_1$ continues this alternating processing between its two buffers $402_1$ and $402_2$ for all of the subsequently generated access requests by the first core $102_1$ as the first core's access requests are sequentially granted.

The (N−1) other parallel address processing stages $400_2$-$400_N$ of FIG. 4 perform analogous, respective alternating processing for the access requests by the (N−1) other cores $102_2$-$102_N$.

The following description corresponds to the previous example scenario in which the first core $102_1$ generates three respective access requests a1_1, a2_1, a3_1 for the first memory bank $110_1$ during the first three clock cycles 1, 2, and 3 and the second core $102_2$ generates three respective access requests b1_1, b2_1, b3_1 for that same first memory bank $110_1$ during those same first three clock cycles 1, 2, and 3, where the first core $102_1$ has higher priority than the second core $102_2$.

For this scenario, assume that, before clock cycle 1, the decoded address for the first access request a1_1 from the first core $102_1$ was stored in the first core's first buffer $402_1$, the decoded address for the second access request a2_1 from the first core $102_1$ was stored in the first core's second buffer $402_2$, and the address for the third access request a3_1 from the first core $102_1$ was stored in the first core's address FIFO $103_1$. Similarly, before clock cycle 1, the decoded address for the first access request b1_1 from the second core $102_2$ was stored in the second core's first buffer $402_1$, the decoded address for the second access request b2_1 from the second core $102_2$ was stored in the second core's second buffer $402_2$, and the address for the third access request b3_1 from the second core $102_1$ was stored in the second core's address FIFO $103_2$.

In that case, in clock cycle 1, the first core's first mask $404_1$ is disabled, and the first core's second mask $404_2$ is enabled, such that the decoded address for the first core's first access request a1_1 is propagated towards the first core's request generator $113_1$, which generates the first core's first access request a1_1. Similarly, in clock cycle 1, the second core's first mask $404_1$ is disabled, and the second core's second mask $404_2$ is enabled, such that the decoded address for the second core's first access request $b_1$_1 is propagated towards the second core's request generator $113_2$, which generates the second core's first access request b1_1. As such, in clock cycle 1, the first arbiter $116_1$ (i) receives the first core's first access request a1_1 from the first core's request generator $113_1$ and the second core's first access request b1_1 from the second core's request generator $113_2$ and (ii) selects the first core's first access request a1_1 for the grant generation step 120 because the first core $102_1$ has higher priority than the second core $102_2$.

The pipelining step 121 will inform the first core $102_1$ of that event in the next clock cycle 2. In response, the first core's parallel address processing stage $400_1$ enables its first mask $404_1$ and disables its second mask $404_2$, thereby allowing the decoded address for the first core's second access request a2_1 to be propagated from its second buffer $402_2$ into the first core's request generator $113_1$, which generates the first core's second access request a2_1. In addition, the first core's parallel address processing stage $400_1$ stores the decoded address for the first core's third access request a3_1 into its first buffer $402_1$. Note that, during clock cycle 2, the state of the second core's parallel address processing stage $400_2$ does not change.

In clock cycle 2, the first arbiter $116_1$ (i) receives the first core's second access request a2_1 from the first core's request generator $113_1$ and the second core's first access request b1_1 from the second core's request generator $113_2$ and (ii) selects the first core's second access request a2_1 for the grant generation step 120 because the first core $102_1$ has higher priority than the second core $102_2$.

The pipelining step 121 will inform the first core 102₁ of that event in the next clock cycle 3. In response, the first core's parallel address processing stage 400₁ disables its first mask 404₁ and enables its second mask 404₂, thereby allowing the decoded address for the first core's third access request a3_1 to be propagated from its first buffer 402₁ into the first core's request generator 113₁, which generates the first core's third access request a3_1. In this example, there are no other addresses in the first core's address FIFO 103₁. Note that, during clock cycle 3, the state of the second core's parallel address processing stage 400₂ does not change.

In clock cycle 3, the first arbiter 116₁ (i) receives the first core's third access request a3_1 from the first core's request generator 113₁ and the second core's first access request b1_1 from the second core's request generator 113₂ and (ii) selects the first core's third access request a3_1 for the grant generation step 120 because the first core 102₁ has higher priority than the second core 102₂.

The pipelining step 121 will inform the first core 102₁ of that event in the next clock cycle 4. Note that the first core's parallel address processing stage 400₁ has logic (not shown in FIG. 4) that determines whether the decoded addresses stored in the first core's first and second buffers 402₁ and 402₂ have not yet been serviced. In this case, since the decoded addresses stored in those buffers 402₁ and 402₂ have both been serviced, the logic will enable both masks 404₁ and 404₂, thereby preventing any decoded address from being propagated towards the first core's request generator 113₁.

As such, in clock cycle 4, the first arbiter 116₁ (i) receives only the second core's first access request b1_1 from the second core's request generator 113₂ and (ii) selects the second core's first access request b1_1 for the grant generation step 120 because it is the only pending access request for the first memory bank 110₁.

The pipelining step 121 will inform the second core 102₂ of that event in the next clock cycle 5. In response, the second core's parallel address processing stage 400₂ enables its first mask 404₁ and disables its second mask 404₂, thereby allowing the decoded address for the second core's second access request b2_1 to be propagated from its second buffer 402₂ into the second core's request generator 113₂, which generates the second core's second access request b2_1. In addition, the second core's parallel processing stage 400₂ stores the decoded address for the second core's third access request b3_1 into its first buffer 402₁. Note that, during clock cycle 5, the state of the first core's parallel address processing stage 400₁ does not change.

In clock cycle 5, the first arbiter 116₁ (i) receives only the second core's second access request b2_1 from the second core's request generator 113₂ and (ii) selects the second core's second access request b2_1 for the grant generation step 120 because it is the only pending access request for the first memory bank 110₁.

The pipelining step 121 will inform the second core 102₂ of that event in the next clock cycle 6. In response, the second core's parallel address processing stage 400₂ disables its first mask 404₁ and enables its second mask 404₂, thereby allowing the decoded address for the second core's third access request b3_1 to be propagated from its second buffer 402₂ into the second core's request generator 113₂, which generates the second core's third access request b3_1. In this example, there are no other addresses in the second core's address FIFO 103₂. Note that, during clock cycle 6, the state of the first core's parallel address processing stage 400₁ does not change.

In clock cycle 6, the first arbiter 116₁ (i) receives only the second core's third access request b3_1 from the second core's request generator 113₂ and (ii) selects the second core's third access request b3_1 for the grant generation step 120 because it is the only pending access request for the first memory bank 110₁.

The pipelining step 121 will inform the second core 102₂ of that event in the next clock cycle. Note that the second core's parallel address processing stage 400₂ also has logic (not shown in FIG. 4) that determines whether the decoded addresses stored in the second core's first and second buffers 402₁ and 402₂ have not yet been serviced. In this case, since the decoded addresses stored in those buffers 402₁ and 402₂ have both been serviced, the logic will enable both masks 404₁ and 404₂, thereby preventing any decoded address from being propagated towards the second core's request generator 113₂.

In this way, the memory-access processing of FIG. 4 provides the following desired sequence of memory-access events for the first memory bank 110₁:

Clock cycle 1: Perform access request a1_1 for the first core 102₁;
Clock cycle 2: Perform access request a2_1 for the first core 102₁;
Clock cycle 3: Perform access request a3_1 for the first core 102₁;
Clock cycle 4: Perform access request b1_1 for the second core 102₂;
Clock cycle 5: Perform access request b2_1 for the second core 102₂; and
Clock cycle 6: Perform access request b3_1 for the second core 102₂.

As such, the memory-access processing of FIG. 4 provides the desired sequence of memory-access events without inducing any bubble/gap between two consecutive accesses to the same memory bank, thereby achieving optimal bandwidth utilization while properly applying the relative priority levels between the different cores 102 and the added pipelining step 121 will reduce the timing congestion at the physical layer.

The invention has been described in the context of a simple example in which only two cores 102 are vying for the same memory bank 110. Those skilled in the art will understand how the invention would work when more than two cores 102 vie for the same memory bank 110.

Although the invention has been described in the context of alternating processing implemented using buffers 402 and masks 404, in other implementations, other suitable mechanisms can be employed to achieve analogous alternating processing.

Although the invention has been described in the context of arbitration techniques based on programmable priority mirroring, the invention can also be implemented in the context of other arbitration techniques, such as fixed priority schemes or adaptive priority schemes such as (without limitation) rotating priority, round robin, and least recently accessed core.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An article of manufacture comprising:
N processing cores, wherein N is an integer greater than 1;
M memory banks, wherein M is an integer greater than or equal to 1; and
a memory controller configured to enable the N processing cores to access the M memory banks, wherein the memory controller is configured to:
receive a sequence of one or more access requests from each of one or more of the processing cores, wherein each access request is a request for access by the corresponding processing core to a specified memory bank; and
process access requests from one or more of the processing cores to generate a current sequence of one or more granted access requests to each of one or more of the memory banks, wherein:
for each processing core, the article comprises first and second buffers, each buffer configured to store an access request;
when an access request from the first buffer is granted, the first buffer is configured to receive a new access request and processing is performed to determine whether to grant an access request stored in the second buffer; and
when an access request from the second buffer is granted, the second buffer is configured to receive a new access request and processing is performed to determine whether to grant an access request stored in the first buffer.

2. The article of claim 1, wherein the memory controller is configured to process the access requests using priority mirroring and bank arbitration.

3. The article of claim 1, further comprising a mask for each buffer, wherein:
when the mask is enabled, the memory controller does not forward the access request stored in the corresponding buffer for processing; and
when the mask is disabled, the memory controller forwards the access request stored in the corresponding buffer for processing.

4. The article of claim 1, further comprising a pipelining step after the generation of the sequence of granted access requests and before execution of the granted access requests.

5. The article of claim 1, comprising an integrated circuit (IC) comprising the processing cores, the memory banks, and the memory controller.

6. The article of claim 1, wherein the memory controller is configured to determine whether an existing access request in a buffer has been serviced before configuring the buffer to receive a new access request and allow the new access request to propagate for request generation.

7. A method for an article of manufacture comprising:
N processing cores, wherein N is an integer greater than 1;
M memory banks, wherein M is an integer greater than or equal to 1; and
a memory controller configured to enable the N processing cores to access the M memory banks, wherein the method comprises:
receiving a sequence of one or more access requests from each of one or more of the processing cores, wherein each access request is a request for access by the corresponding processing core to a specified memory bank; and
processing access requests from one or more of the processing cores to generate a current sequence of one or more granted access requests to each of one or more of the memory banks, wherein:
for each processing core, the article comprises first and second buffers, each buffer configured to store an access request;
when an access request from the first buffer is granted, the first buffer is configured to receive a new access request and processing is performed to determine whether to grant an access request stored in the second buffer; and
when an access request from the second buffer is granted, the second buffer is configured to receive a new access request and processing is performed to determine whether to grant an access request stored in the first buffer.

8. The method of claim 7, wherein the memory controller processes the access requests using priority mirroring and bank arbitration.

9. The method of claim 7, wherein the article further comprises a mask for each buffer, wherein:
when the mask is enabled, the memory controller does not forward the access request stored in the corresponding buffer for processing; and when the mask is disabled, the memory controller forwards the access request stored in the corresponding buffer for processing.

10. The method of claim 7, further comprising a pipelining step after the generation of the sequence of granted access requests and before execution of the granted access requests.

11. The method of claim 7, further comprising determining whether an existing access request in a buffer has been serviced before configuring the buffer to receive a new access request and allow the new access request to propagate for request generation.

12. The method of claim 7, wherein:
the article comprises more than two memory banks; and
the first and second buffers are the only parallel buffers for each processing core.

13. The method of claim 7, wherein each first buffer and each second buffer is configured to store an access request for any memory bank.

14. The article of claim 1, wherein:
the article comprises more than two memory banks; and
the first and second buffers are the only parallel buffers for each processing core.

15. The article of claim 1, wherein each first buffer and each second buffer is configured to store an access request for any memory bank.

* * * * *